United States Patent [19]

Roberts et al.

[11] Patent Number: 5,820,302
[45] Date of Patent: Oct. 13, 1998

[54] STABILIZING SOIL AND AGGREGATE MIXTURES AND STRUCTURES

[75] Inventors: Michael Stephen Roberts, Westlake; Peter Atkinson, Gaven; Nicholas James Calos, Coorparoo; David Lethbridge Oliver, Buderim, all of Australia

[73] Assignee: AD-Base Pty Ltd., Brisbane, Australia

[21] Appl. No.: 737,301

[22] PCT Filed: Apr. 19, 1995

[86] PCT No.: PCT/AU95/00221

§ 371 Date: Oct. 21, 1996

§ 102(e) Date: Oct. 21, 1996

[87] PCT Pub. No.: WO95/28456

PCT Pub. Date: Oct. 26, 1995

[30] Foreign Application Priority Data

Apr. 19, 1994 [AU] Australia ............................ PM 5200
Apr. 19, 1994 [AU] Australia ............................ PM 5201

[51] Int. Cl.$^6$ .............................. E02D 3/12; C09K 17/00
[52] U.S. Cl. .................. 405/263; 106/606; 106/697; 106/900; 405/258; 405/266
[58] Field of Search ..................... 405/263, 266, 405/258; 106/900, 606, 607, 633; 166/292, 293

[56] References Cited

U.S. PATENT DOCUMENTS

| | | | |
|---|---|---|---|
| 1,943,584 | 1/1934 | Cross | 405/263 X |
| 2,437,387 | 3/1948 | Hodgson | 405/263 |
| 3,146,828 | 9/1964 | Mann | 106/633 X |
| 3,294,563 | 12/1966 | Williams | |
| 3,411,582 | 11/1968 | Dale | 405/263 X |
| 3,841,102 | 10/1974 | Cinner et al. | 405/263 X |
| 4,229,295 | 10/1980 | Krofchak | 405/263 X |
| 4,521,136 | 6/1985 | Murphey | 405/263 |
| 4,615,643 | 10/1986 | Gouvenot | 405/263 X |
| 4,642,137 | 2/1987 | Heitzmann et al. | 106/607 |
| 4,696,698 | 9/1987 | Harriett | 405/263 X |
| 5,336,022 | 8/1994 | McKennon et al. | 405/263 |
| 5,468,292 | 11/1995 | Kayahara et al. | 106/900 X |

FOREIGN PATENT DOCUMENTS

| | | |
|---|---|---|
| 1517342 | 4/1970 | Germany . |
| 2544543 | 4/1977 | Germany . |
| 484275 | 5/1938 | United Kingdom . |

OTHER PUBLICATIONS

Database WPI, Section Ch, Week 9224, Derwent Publications Ltd., London, GB; Class L02, AN 92–192584, XP002030751 & AU 85522 91 A (Austaim Technologies Pty Ltd). Apr. 9, 1992, abstract.

Database WPI, Section Ch, Week 8030, Derwent Publications Ltd., London, GB; Class L02, AN 80–52093C, XP002030752 & JP 55 075 481 A (Ohbayashi Gumi KK), Jun. 6, 1980, abstract.

Supplementary European Search Report dated May 12, 1997.

*Primary Examiner*—Dennis L. Taylor
*Attorney, Agent, or Firm*—Knobbe, Martens, Olson & Bear, LLP

[57] ABSTRACT

A method of stabilizing soil and aggregate for structural purposes including the step of mixing with water: (a) a soil aggregate base material; (b) a stabilization composition comprising: (i) an alkali metal silicate or other suitable gel precursor, and (ii) optionally a cation; and (c) a minimum amount of 1% of cement based on the weight of the resulting mixture, whereby sufficient water is added to the resulting mixture to hydrate the cement and thereby provide a stabilized soil aggregate matrix suitable for use in a structure. There is also provided a method of forming a structure which includes the steps of: (i) sampling a soil aggregate base material to carry out one or more Atterberg tests as well as UCS or CBR; (ii) determining target amounts of cement from the results of such tests; and (iii) substituting a percentage of the target amounts of cement with a stabilization composition comprising: (a) an alkali metal silicate or other suitable gel precursor; and (b) a cation, as well as a stabilization composition for use in the methods described above.

33 Claims, 5 Drawing Sheets

STABILIZING SOIL AND AGGREGATE MIXTURES AND STRUCTURES

FIELD OF THE INVENTION

This invention relates to a method of stabilising soil aggregate mixtures, structures formed by said method, and compositions for use in the method.

BACKGROUND OF THE INVENTION

The term "soil" as used herein may include within its scope all unconsolidated materials above bedrock or the natural medium for growth of land plants and may also include a mixture of silt, gravel and sand. Soil may also normally contain fines which may be considered to be plastic material comprising mainly of particles having diameters less than 0.074 mm (i.e. silt) and also particles less than 0.002 mm (i.e. clay). Such particles may be colloidal particles and thus may be considered to be a loose, earthy, extremely fine grained natural sediment or soft rock characterised by high plasticity and by a considerable content of clay minerals. Clay minerals are one of a complex and loosely defined group of finely crystalline, metacolloidal or amorphous hydrous silicates essentially of aluminium and sometimes magnesium and iron. The most common clay minerals belong to the kaolin, montmorillonite (smectite) and illite groups. Clay particles may form a plastic, mouldable mass when finely ground and mixed with water which retains its shape on drying and becomes firm, rigid and permanently hard on heating.

There are many different types of soils containing varying percentages of clay. However, soils which may be used in relation to construction of structures based on soil aggregate mixtures will usually contain from 0.5–20% of clay. When soils contain higher percentages of clay e.g. black soil, such soil is usually not appropriate for forming structures.

Aggregate which includes crushed rock or stone may be naturally present in admixture with the soil or may be added to the soil for construction of structures which may include road pavements, wall structures or other building products. In relation to construction of the abovementioned structures cement may be mixed with soil aggregates to strengthen the resulting substrate caused by hydration of the cement at a "macro" level to bind the soil aggregate into a resulting stabilised matrix.

Tests known as "Atterberg Tests" are carried out on all soil aggregates to determine their physical properties to indicate the likely percentage required of the cement additive and ratios required to achieve a target strength for the soil aggregate structure. Further tests that may be carried out include California Bearing Ratio (CBR) which measures the degree of penetration into the soil of a standard weight and Unconfined Compressive Strength (UCS) which measures the degree of compression of the soil after mechanical compaction.

The Atterberg Tests may follow an initial procedure which includes passing the soil through a 75 micron sieve to determine the fines component of the soil wherein the fines are defined as finely divided particles having a diameter of 0.074 mm or less.

A linear shrinkage (LS) test may then be carried out wherein soil at optimum moisture content (OMC) is placed into a standard mould and cured (i.e. dried out). The amount of shrinkage observed thereby determines the linear shrinkage i.e. (LS).

The "optimum moisture content" is defined as that moisture content at which soil achieves maximum dry density (MDD) using standard compaction effort e.g. by usage of a proctor hammer.

The conventional procedure therefore in ascertaining the amount or percentage of cement required to be added to the soil aggregate in relation to road pavements for example was to determine the LS result and subsequently carry out a series of CBR and/or UCS tests and from these results determine by linear interpolation the amount of cement additive required.

Generally in relation to road pavements the amount of cement required was proportional to the LS value of the soil sample. For example, in general terms, a cement percentage of 2–3% would correspond to a LS of 4–5 and the maximum cement additive utilised was 5–8% corresponding to an LS of the soil sample of 10–12. In this regard the percentage of cement required was calculated on the dry weight of the soil sample.

However, the use of cement in excess of the relatively small percentages referred to above has a detrimental effect on the road pavement structure. This occurs because:

(a) the soil structure becomes fully bound and results in a soil structure which is very brittle with low flexural strength and which accordingly easily fractures and cracks under constant and repetitive loading; and (b) water content above an optimum level which is required to hydrate the cement causes undesirable shrinkage levels.

Both (a) and (b) result in crack development in the road pavement with subsequent deterioration and subsequent early break up of the road.

In relation to other building structures or building components inclusive of walls, pens, and buildings which may be formed from soil-aggregate combinations, it was also the practice as in the construction of road pavements discussed above to add cement in powder form to the soil aggregate mixture and calculate the amount of cement required based on the dry weight of the mixture of soil and aggregate. Generally one could utilise cement up to 25% by weight of the soil to provide a stabilised matrix as discussed above.

However, in relation to making structures generally from soil-aggregate mixtures, it was usually not possible to make such structures or components from low grade soil types whereby the cement when hydrated could not form a stabilised matrix structure. Low grade soil types included for example only finely grained soils or wherein such soils included insufficient aggregate or aggregate particles of insufficient variation in size to provide a structure which could be formed from "mechanical interlock" or bearing contact between particles under compaction, in combination with the cement when hydrated with the addition of water. Low grade soil types also include materials with expansive or reactive clays in quantities that cannot be stabilised by cement alone.

Another problem in relation to formation of structure or components from a soil aggregate base was that usually it was necessary to transport high grade building materials for example sand and aggregate of appropriate particle size to a particular site whereby ready access was only provided for low grade soil aggregate types. This was found to be unduly expensive or in some cases unavoidable delays occurred because of the fact that the high grade building materials were located at a location remote from the site.

Another problem that was also prevalent in relation to road pavement structures was that the cement content had to be carefully controlled because if the cement content was excessive the disadvantages (a) and (b) referred to above would also apply.

A conventional soil stabilisation composition is described in Australian Patent Specification 85522/91 in the name of Austaim Technologies Pty. Ltd. which concerns a composition for stabilisation of cement and soil. Such a composition is in two parts—a first part comprising sodium, magnesium, ammonium ion, chloride and carbonate and a second part comprising a liquid including silicates, sodium and water. The first part is formed by mixing the above components with the carbonate added last and supplied in powder or liquid form. The second part or activator is then mixed with the first part and is active for 2 hours only and must be applied to the relevant substrate in this period, which is usually a cement-soil mixture in the case of a road base or cement in the case of a building material. In the first part magnesium may be present in a range of 0.5–3% by weight, ammonium ion present in a range of 5–15% by weight, chlorides present in a range of 40–60% by weight and carbonate present in a range of 2.5–5% by weight. In the second part silicates may be present in a range of 20–40% by weight as silicon dioxide.

The stabilisation product of Specification 85522/91 may be used in the production of building blocks, bricks, walls, foundations or slabs or walls, and embankments for roads and pavements. The stabilising composition of the invention reacts with soil/cement mixtures to neutralise the effects of salt water while addition to cement provides a concrete with higher flexural strength than conventional concrete.

One of the problems of the prior art discussed above is that to date it has not been possible to provide a stabilisation composition which is most effective when used in relation to a particular type of soil in relation to construction of road pavements or other structures which may be formed from a soil aggregate composition. This applies in particular to the compositions of Australian Specification 85522/91 which were found to be variable in practice with good results in some cases and indifferent results in other cases. It has been hypothesised that the variable behaviour of such conventional stabilisation compositions was due to the fact that different clays or soils were used in such compositions and the choice of soil or clay often affected the stability of the resulting composition.

SUMMARY OF THE INVENTION

It therefore is an object of the invention to provide a method of stabilising soil and aggregate for structural purposes.

The method of the invention in a first aspect includes the steps of:
(i) combining a soil aggregate base material with a composition comprising:
   (a) an alkali metal silicate; and
   (b) a water soluble divalent or trivalent cation;
(ii) adding cement to the combination of the base material and the composition wherein the minimum amount of cement added is 1% based on the weight of the soil aggregate base material; and
(iii) adding water to the resulting mixture whereby sufficient water is added to the resulting mixture to hydrate the cement and thereby provide a stabilised soil aggregate matrix suitable for use in a structure.

In the first aspect of the invention the range of proportions of cement utilised is preferably at a maximum of 25% based on the weight of the base material and more suitably 15%, and may be as low as 1–5% in the case of pisè or rammed earth structures. In the case of road pavements the amount of cement utilised may be of the order of 1.5–4.0% and more preferably 2–3%.

The silicate may comprise 10% based on the weight of the base material and more preferably 1% and has a minimum content of 0.001% based on the weight of the base material. A preferred content is 0.075–0.3%.

However, it will be appreciated that there is no effective upper limit of silicate that may be used. Such upper limit is of course influenced by the cost of the silicate.

The cation component may be present in a maximum amount of 3% and more suitably 1% based on the weight of the base material because the use of a higher amount of cation component would appear to be precluded because such higher amount may cause flash setting of the mixture. A suitable lower limit is 0.004%. A preferred content is 0.06–0.3% in the case of road pavements and 0.1–2% in the case of structures other than road pavements. Generally 0.03–0.095% may be utilised. Suitably the divalent or trivalent cation is added to the mixture of the soil aggregate material and silicate already in solution.

However, in some cases the cation component may be present in the soil aggregate base material and thus may not be included in the stabilisation composition so that in this particular embodiment a single stabiliser (i.e. the silicate) may be utilised. In this embodiment therefore the soil aggregate base material may be subjected to an initial titration procedure or other suitable detection method to determine the presence of the cation e.g. by the addition of cement as hereinafter described.

Preferably the addition of the silicate should precede the addition of the cement. However, this may be modified subject to confirmation by way of heats of hydration that accelerated setting of the cement is avoided.

Therefore, the invention may include within its scope the simultaneous addition of stabilisation composition and cement to the soil aggregate base material.

Water may be added at any time to the mixture but most preferably when (a), (b) and (c) have formed a total admixture.

The base material comprising soil and aggregate to which the method of the invention may be applied may include any low grade soil type. Thus for example, the method of the invention may be utilised in relation to soil types which are usually classified as having an LS of above 8 and more suitably 10–14.

In a second aspect of the invention, there may be provided a stabilisation composition for use in the abovementioned method.

It is highly desirable in regard to the stabilisation composition of the invention that such stabilisation composition excludes chloride anion as this anion is corrosive and also excludes sulphate anion in the case when a road pavement formed from bitumen is being formed because sulphate anion reacts with bitumen.

In a third aspect of the invention there is provided a method of forming a structure (e.g. a road pavement) which includes the steps of:
(i) sampling a soil aggregate base material to carry out one or more Atterberg tests as well as UCS or CBR;
(ii) determining target amounts of cement from the results of such tests; and
(iii) substituting a percentage of the target amounts of cement with the aforementioned stabilisation composition.

In this aspect of the invention, the method of mixing the soil aggregate base material, cement and the stabilisation composition may be in accordance with the first aspect of the invention.

In this second aspect of the invention, a sample from a soil aggregate base material may be taken from uncompacted or unconsolidated soil comprising silt, sand, clay and aggregate. The term "gravel" in this context refers to a matrix of aggregate, clays, sands and silt to thereby provide a composite material which derives its strength through (a) "mechanical interlock" (i.e. bearing contact between particles of greater diameter than 75 microns) as well as (b) "cohesion" which refers to Van der Waals forces or charge attractions between finely divided particles of diameters less than 75 microns. In this regard if water is applied to such a composite material the cohesion may increase up to a certain point i.e. when the OMC value is realised and thereafter the cohesion may decrease.

In relation to initial design of a road pavement or other structure, it is usually necessary to evaluate the "design strength" of the structure so that in one situation the structure may be stabilised to make it a rigid structure—i.e. a structure which is inflexible similar to low strength concrete—i.e. there is no load deflection to facilitate mechanical or aggregate interlock. Resistance to an applied load in stabilised material is based primarily on shear and compression resistance through bonding of particles. Usually structures such as rigid pavements have a compressive strength of 1–2 megapascals and this is determined by UCS tests.

In another situation, a "modified" structure may be required in a road pavement where there is a need to reduce the cohesion of the clay components and allow greater mechanical interlock between particles (the clay particles usually function to provide lubrication for larger particles and thus encourage greater mobility of the larger particles in the soil matrix). In this regard in flexible pavements it is desirable to break down the structure of the clays in the soil to facilitate greater mechanical interlock. Flexible or modified pavements may have their characteristics determined by the CBR test.

In therefore taking an initial soil sample for a road pavement from a particular site such sample may be subjected to the "Atterberg" tests as described above and thereby determine whether a flexible structure or rigid structure is relevant to such site. Therefore the soil samples may be initially subject to sieve tests where a number of sieves of different pore or aperture sizes may be utilised to determine size specifications of the soil. For example, if there is an abundance of larger size particles greater than 75 microns in size a flexible structure is more appropriate. However, if the reverse is appropriate and there is an abundance of fines then a rigid structure would be more suitable. Thus the sieve analysis would work out the ratio of fine particles to larger size particles.

Another Atterberg test is determination of the "Plastic Index" or PI which is the difference between the "plastic limit" which is the point at which the soil becomes "unbound"—i.e. where there is insufficient water to keep the soil particles bound and the "liquid limit" (LL) which is carried out by a penetrometer and which determines the amount of water required to make the soil sample "liquid".

The OMC or "Optimum Moisture Content"—which is described above determines the moisture level at which the soil particles achieve maximum dry density (MDD). The OMC may be determined by taking a soil sample, drying out the soil sample, dividing the soil sample into a number of batches, drying out each batch and adding different amounts of water to each batch to provide varying moisture contents. The batches are then compacted in a mould using a proctor hammer and subsequently dried. The moisture content for each batch may then be plotted against the dry density of each batch and the OMC is the moisture content which corresponds to the maximum dry density (MDD) of the resulting plot.

The preferred method of assessment of "linear shrinkage" or LS is to utilise the procedures of Australian Standard AS1289 3.4.1 using particles of sizes less than 75 micron (Australian Standard AS1289 uses particles of less than 425 micron) at OMC.

The LS value may then be determined by:
(i) mixing fine particles (less than 75 microns) with $H_2O$ to achieve an OMC level;
(ii) placing the particles in a standard shrinkage mould and allowing the particles to dry; and
(iii) measuring the shrinkage of the particles.

Generally if the LS is less than 4, there is 2% cement required in the stabilised soil matrix. If the LS is around 8, then by a rough rule of thumb generally 4% cement is required to bring the LS back to 4. An LS value of around 8 would apply to both rigid and flexible pavements.

The amount of target cement additive which is required may be determined by mixing cement with the soil sample at varying ratios or percentages to provide a series of batches and subjecting each batch to a UCS test in megapascals in relation to a rigid pavement. If the desired soil aggregate stabilised matrix has a target strength of 1 MPa then 3% cement may be required. This may be determined from graphing UCS values against cement percentage values wherein the percentage target cement values may be included on the y-axis and UCS values in increments of 0.5 MPa from the origin may be included on the x-axis.

If the LS is greater than 8, i.e. between 8–12 again the target cement may be plotted against the UCS values as described above and a particular UCS value found corresponding to a target cement value so as to determine the target strength value required.

In relation to flexible pavements, cement in the relevant percentages required may be mixed into the soil and water added so as to form the stabilised soil aggregate matrix. The matrix may then be broken up and the soil aggregate may then be mixed with water to achieve OMC. A CBR test may then be carried out—i.e. resistance to penetration through aggregate interlock may be determined and a range of CBR values may be plotted against a range of target cement percentages as described above to determine the target cement percentage required for a particular situation.

In accordance with a preferred embodiment of this invention, part and up to 50% of the target cement calculated by the aforementioned conventional route may be replaced by the aforementioned stabilisation composition. Suitably 5–15%, and more preferably 10% of the target weight of cement used in the mixture or matrix is augmented by the stabilisation composition. Thus if 3.0% target cement by weight is required, suitably 2% cement by weight of base soil aggregate can be used and that cement content may be augmented by 0.20% by weight of base soil aggregate of stabilisation composition.

When the stabilised soil aggregate matrix has again been formed with the addition of the stabilisation composition as described above, then the target strengths required may be again verified by CBR and/or UCS tests in a similar manner as described above.

In a typical flexible pavement situation the pavement may be constructed with a plurality of adjacent layers corresponding to CBR values which decrease in height downwardly. Thus for example below a bitumen or asphalt seal or top layer there may be provided stabilised soil aggregate layers of CBR 80, CBR 45 and CBR 10–15 which covers a sub grade strata of CBR 3–5.

In a typical rigid pavement situation, there may be provided a sub grade of CBR 5–10 and a bound pavement top layer of 1 MPa–2 MPa.

Advantages of the first and third aspects of the invention as applied to structures including road pavements include the following:

(i) reduction in cement content in regard to production of stabilised soil aggregate matrix;

(ii) the method of the second aspect of the invention may now be applied to a wider range of gravels—i.e. one can now use gravels having a higher LS value than what could have been used before i.e. gravels having an LS of 8 or greater can now be used in road pavements;

(iii) the process has economic benefits;

(iv) stabilised soil aggregate matrices can now be produced having greater durability under moisture;

(v) production of structures of reduced permeability to water which maintain structural integrity by (a) elimination of possible damage due to leeching, (b) reduced reactivity to water, and/or (c) reduced shrinkage when subjected to water action; and (vi) maintenance of structural integrity while having an increased flexibility, i.e. having a higher capacity to withstand repeat load deflection.

However, it will also be appreciated that the first and third aspects of the invention can also apply to structures generally inclusive of wall structures, floors, and building products inclusive of bricks or large blocks. In this situation however a rigid structure is usually required.

Cements for use in the present invention refer to inorganic hydraulic cements which on hydration form relatively insoluble bonded aggregations of considerable strength and dimensional stability. Portland cement, for example, consists mainly of tricalcium silicate and dicalcium silicate. Cement may be formed from raw materials inclusive of one rich in calcium such as limestone, chalk or marl and the other rich in silica such as clay or shale.

Cements are predominantly calcium silicates, aluminates and ferrates which on reaction with water form hydrated silicates, aluminates and calcium hydroxide. As cement takes on water it swells and forms a gel which sets into interweaved micro crystalline or colloidal clusters of hydrate minerals which are largely $(CaO)_3$ $(SiO_2)_2$ $(H_2O)_3$ and $(CaO_4)_4$ $Al_2O_3$ $(H_2O)^{13}$. Cements therefore may include $(CaO_3)$ $SiO_2$, $(CaO)_2$ $SiO_2$ $(CaO)_3 Al_2O_3$ and $(CaO)_4 Al_2O_3$ $Fe_2O_3$.

The action of the cation component is in regard to the clays that are a common component of soil and to examine this point in greater detail it is necessary to consider the structure of clays.

Clays to which the invention may be specifically although not exclusively applicable are clays which are capable of swelling or shrinking which is directly dependent on the amount of interlaminar water they may absorb at the unit cell or molecular structure level. In the dry state such clays consist of sheets of aluminosilicate structure, loosely bound together into three dimensional stacks by interlaminar ions. With increasing moisture in the environment, the interlaminar ions, and indeed the sheets themselves hydrate and the extra volume of the water forces the sheets apart. Thus the clay swells in water.

Materials may be forced into the laminae to bind them together more tightly or alternatively to maintain their expansion in the dry state. This process is known as "pillaring" of the clays. The laminae may be forced apart to such an extent, or made to repel each other to the effect that the three dimensional stacking sequence is lost. This is termed "delamination" of the clays. The repulsive forces existing between the laminae may be overcome by using strong electrolyte solutions (i.e. flocculants) causing the clay material to aggregate.

Many clays carry an excess negative change owing to internal substitution by lower-valent cations, and thereby increase internal reactivity in chemical combination and ion exchange.

A broad definition of "clay" includes the following properties:

(i) the predominant content of clay minerals, which are hydrated silicates of aluminium, iron or magnesium, both crystalline and amorphous;

(ii) the possible content of hydrated alumina and iron;

(iii) the extreme fineness of individual clay particles that may be of colloidal size in at least one dimension;

(iv) the property of thixotropy in various degrees of complexity; and (v) the possible content of quartz sand and silt, feldspars, mica, chlorite, opal, volcanic dust, fossil fragments, high density so called heavy minerals, sulfates, sulfides, carbonate minerals, zeolites and many other rock and mineral particles ranging upward in size from colloids to pebbles.

Crystalline clay minerals are identified and classified primarily on the basis of crystal structure and the amount of locations of charge (deficit or excess) with respect to the basic lattice. Amorphous (i.e. to x-ray) clay minerals are poorly organised analogues of crystalline counterparts. Clay minerals are divided into crystalline and paracrystalline groups and a group amorphous to x-rays.

Crystalline and paracrystalline groups include kaolins [kaolinite, dickite, nacrite (all $Al_2O_3.2SiO_2.2H_2O$), and halloysite-endellite ($Al_2-O_3.2\ SiO_2.2H_2O$ and $Al_2O_3.2 SiO_2.4H_2O$, respectively)]; serpentines which substitute $Mg_3$ in the kaolin structure ($Mg_3Si_2O_5(OH)_4$); smectites (montmorillonites), which are the 2:1 clay minerals that carry a lattice charge and characteristically expand when solvated with water and alcohols, notably ethylene glycol and glycerol (which smectites also include bentonite), illites or micas, illites being the general term for the clay mineral constituents of argillaceous sediments belonging to the mica group; glauconite, a green, dioctahedral, micaceous clay rich in ferric iron and potassium; chlorites and vermiculites which are regularly interstratified (1:1) and attributed to the mineral corrensite; attapulgite and sepiolite; and mixed-layer clay minerals that exhibit ordered and random intercalation of sandwiches with one another.

Allophane is an amorphous clay that is essentially an amorphous solid solution of silica, alumina, and water. Imogolite is an uncommon, thread-shaped paracrystalline clay mineral assigned a formula $1.1 SiO_2.Al_2O_3.2.3-2.8H_2O$. Several hydrated alumina minerals should be grouped with the clay minerals because the two types may occur so intimately associated as to be almost inseparable (diaspore and boehmite, both $Al_2O_3.H_2O$, gibbsite, $Al_2O_3.3H_2O$, and cliachite).

The alkali metal silicate for use in the invention may include sodium silicate or potassium silicate or the silicate of any other alkali metal.

It has been observed that after addition of the stabilisation composition to the soil, a micro and macro reaction take place within the clay component of the soil. The micro reaction is (i) the cation exchange within the lattice of the clay particle leading to pillaring or restructuring of the clay particle and (ii) initation of the silica gel formation. The silicate then stabilises the particle in its restructured form, further binding the micro particles together in a more stable structure.

The macro reaction is the binding of the whole matrix together by way of the hydration of the cement.

The cation is suitably selected from divalent or trivalent metal cations such as alkaline earth metal cations (e.g. $Ca^{2+}$ $Mg^{2+}$ $Ba^{2+}$ $Sr^{2+}$) or trivalent metal cations such as $Al^{3+}$. Transition metal cations such as $Ni^{2+}$ $Cu^{2+}$ $Zn^{2+}$ $Co^{2+}$ and $Mo^{2+}$ may also be used. Alternatively organic cations may be utilised such as the cations of tertiary or secondary amines.

In relation to the mode of action of the cation on clays, such cation may act in two ways on clays:

(1) the phylosilicates (two layer formation) may be pillared by the cations diffusing within the crystal lattices; or (2) the clay may be flocculated by absorption of the cations onto the negatively charged surface, thereby reducing the electro-static repulsion between particles (i.e. the zeta potential).

The stabilisation composition of the invention may therefore act in three ways upon the clays, i.e.:

1. the clays are fixed crystallographically to prevent to some extent volume changes on exposure to water;
2. the interstices or micropores are blocked by the silicate gel formation within or around them; and
3. the larger aggregate particles thus formed are bound by the cementitious material along with the remaining material composition.

In these situations the cement has a two stage function:

(a) when combined with the soil aggregate mixture to hydrate with the water dividing the clay particles and fixing or stabilising it thus reducing the reactivity of the clay to varying moisture contents; and (b) to hydrate and bind all the particles and aggregate of the total mixture into a strong homogeneous matrix.

Functions (a) and (b) may operate in varying degrees depending on the water content of the soil.

The following criteria of the soil determines the varying formulations and preparations of the stabilisation composition:

(1) Its swelling/shrinking characteristic. The degree to which a soil shrinks or swells is determined by:
    (a) the type of the clay forming part of the soil which may be determined by LS and Atterburg Tests;
    (b) the clay content within the soil as determined by particle distribution (PD) as discussed herein; and
    (c) the cation exchange capacity of the clay; and
(2) Its pH value.

The organic content of the soil aggregate should be determined prior to undertaking CBR and UCS testing. The organic content should be limited to levels where it does not significantly reduce concrete strength that would otherwise be obtained if no organic content were present. The organic content of soils usually used is unlikely to be such that it will significantly influence the effect of the components of the stabilisation composition of the invention.

Silicate is a delaminating agent—to separate the sheets of alumino silicate, allowing the ingress of cation (or flocculent). Silicate may also cause precipitation and neutralization of accelerating agents (which may already be present in the soil (e.g. $Fe_2O_3$)) and later, gelaticin to form a stable matrix. Silicate also retards the setting of cement allowing better hydration in the presence of the cation or flocculant.

The presence of divalent or trivalent cation or other form of accelerant in the soil aggregate base material may be detected by mixing the fines content of the base material after passage through a 75 micron screen with cement so that the resulting mixture has a cement content of 2% by weight of the mixture. An accelerator may be present if the temperature rise of the mix after 8 minutes exceeds 5° C.

Clays have varying cation exchange capacity ranging for example from 10–40 m eq/100 gm of clay in the case of low cation exchange clays such as illites or kandites to 80–150 m eq/100 gm of clay in the case of high cation exchange clays such as smectites. Addition of a stabiliser cation external to the clay can therefore be exchanged with the internal cation and theoretically become unavailable for reaction with the silicate in the gelling process. The actual cation needed does not have to exceed the cation exchange capacity of the clay as the cation exchange process will have a finite rate content for exchange. In general, the cation exchange capacity of the clay does dictate the cation need and this should be of magnitude comparable to the cation exchange capacity of the clay to facilitate the gelling process. In practical terms, as the cation concentration is increased, the gelling process is accelerated so that eventually flash setting of the soil aggregate mixture which includes cement will occur if the concentration of cation is too high. In our experience, a concentration in excess of 3% based on the dry weight of the mixture may lead to flash setting.

A preferred stabilisation composition of the invention for use with soils of low cation exchange capability includes $Ca(NO_3)_2$ as well as sodium silicate. It is preferred to avoid the use of chloride ion as an anion which may accelerate flash setting of the cement. Chloride ion may also have a deleterious effect on bitumen. This also applies to sulphate ion. $Ca(NO_3)_2$ also has the ability of being deliquescent i.e. to attract water from the atmosphere. It also may be useful to include calcium lignosulphate which may function as a retardant. Nitrite ion may also be useful to prevent corrosion of any reinforcement included in a concrete structure.

It also is useful when testing soils in regard to their pH that alkaline soils (i.e. pH >8) are usually of high cation exchange capability, i.e. they normally will contain smectite. If the pH is between 6–8 then the soil may be non-plastic and contain only a minor amount of clay component. If the pH is less than 6 then the soil will generally be of low cation exchange capability. However, if pH is between 6–7 then in some cases the soil will still be of low cation exchange capability.

The LS values may also have some relevance here. If the LS value is >8 then the soil will usually be of high cation exchange capability. If the LS is relatively low, i.e. less than 5, the soil will generally be of low cation exchange capability.

Some soil aggregate mixtures of relatively high pH (e.g. 9–10) may have buffers or pH modifiers added thereto to bring the pH to around 7.5–8.5 to encourage silica gel formation. Suitable pH modifiers include a mixture of ammonium chloride and sodium carbonate, sodium bicarbonate, ammonium ion, acetate ion or organic acids.

BRIEF DESCRIPTION OF THE DRAWINGS

Reference may now be made to a preferred embodiment of the invention as shown in the attached drawings wherein.

DETAILED DESCRIPTION

Example 1

Figure 1:
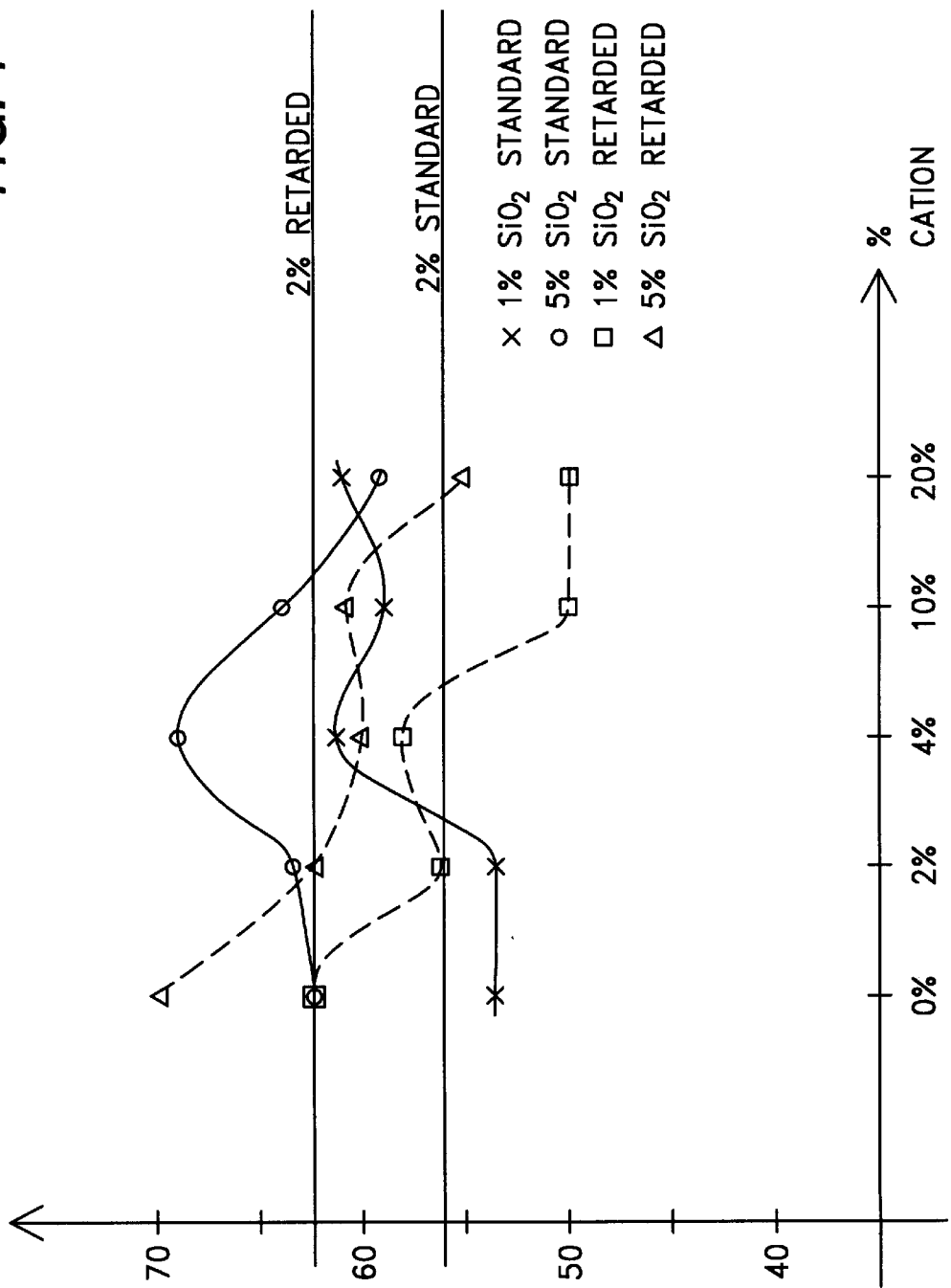
FIG. 1 is a graph showing the results of the experiment reported in Example 2.

Reference may also be made to a practical method for determination of dosage rates of components of the stabilisation composition as described above.

Practical Procedure for Establishment of Stabilisation Dosage

1ST STEP: For soil aggregate base material:

determine OMC and MDD (Maximum Dry Density);

determine Atterberg limits except prepare LS for particles <75 microns at OMC (not <425 microns at LL);

determine cation need from soil chemistry, i.e. pH, cation exchange capacity of the clay, etc.

2ND STEP: Select cement type (e.g. retarded cement or standard cement such as Portland A) and cement content most suited for application and determine UCS (fully soaked).

3RD STEP: Conduct relative shrinkage improvement tests for each selected cement content (there may be several) using the following procedure:
 (i) establish that there are no inherent accelerants in soil aggregate and determine "cement only" RSI;
 (ii) using the selection process below, select the three appropriate metal silicate dosages and determine RSI for cation dosage of 0%, 2%, 4%, 8% and 16% (prepare samples by mixing in metal silicate first, cation second and cement last);
 (iii) plot the results and select the optimum dosage ratio of silicate and cation for that cement content;
 (iv) repeat for each cement content selected;
 (v) determine UCS (fully soaked) for each optimum dosage ratio selected and compare with cement only UCS (2ND STEP); and
 (vi) select final cement content and dosage ratio.

Selection Guide for RSI Trials a. If LS>10 and % pass 75 μm <15 test silicate dosage at 1%, 5% & 10% b. If LS>10 and % pass 75 μm >15 test silicate dosage at 5%, 10% & 20% c. If LS<10 and % pass 75 μm <15 test silicate dosage at ½%, 2% & 5% d. If LS<10 and % pass 75 μm >15 test silicate dosage at 1%, 5% & 10%.

Example 2

This example refers to a practical example of determining stabiliser dosage rate and type of cement for a road pavement and is a modified procedure to the procedure described in Example 1. This procedure included the following steps:

(a) The design target strength (TS) for the road pavement was determined to be 1.5 MPa.

(b) The sample of soil aggregate was tested for MDR (Moisture Density Relationship) as determined by Australian Standard (AS) 1289 5.1.1 which is used to determine Optimum Moisture Content (OMC) and Maximum Dry Density (MDD). The results obtained were OMC 6.8% and MDD 2.183 t/m$^3$.

(c) The sample was also screened to 75 microns.

(d) Cement types consisting of (i) Portland cement (standard) and (ii) Fly Ash Blend (retarded) (hereinafter referred to as FAB) were selected for testing.

(e) Dosages of sodium silicate selected for testing were (i) 1% and (ii) 5% which were calculated on the weight of cement.

(f) The soil aggregate sample was tested at various cement contents in a UCS procedure. The results are shown in Table 1. From the results, as the TS is 1.5 MPa, the Relative Shrinkage Improvement (RSI) can be tested in step (g) as described hereinafter. In this respect, the RSI can be determined from the following equation:

$$RSI = \frac{LS \text{ of soil sample without stabiliser} - LS \text{ of sample with addition of stabiliser}}{LS \text{ of sample without stabiliser}}$$

(g) The LS was tested at 2% PCS and 2% FAB and using the same cement contents the LS was tested at the following dosages of silicate and cation:
 (i) 1% silicate and 0%, 2%, 4%, 10% and 20% cation dosages; and
 (ii) 5% silicate and 0%, 2%, 4%, 10% and 20% cation dosages. The results are shown in FIG. 1.

(h) From a review of the results shown in FIG. 1, the highest RSI was determined using standard cement and stabiliser dosage at 5% silicate and 4% cation based on the weight of cement.

It should then be possible to test UCS at lower cement contents than 2% using the dosages referred to in step (h). A lower cement content can therefore be found, augmented by the stabiliser that still meets TS of 1.5 MPa.

Example 3

A soil aggregate base material was assayed and had the following characteristics LL=19.4, PI 2.0, PL=17.4, LS=2.2 and MDR i.e. OMC=8.4% and MDD=2.145 t/m$^3$.

The soil aggregate base material was also passed through a particle distribution (PD) sieve. The results are shown in Table 2.

This meant that the fines content (FC) was 10%.

The soil aggregate material was tested for the presence of accelerator and it was determined that no accelerator was present.

The target strength (TS) was 1.5 MPa.

The sample was then subjected to a UCS procedure at 1%, 2% and 3% cement content by weight of the base material. The results are shown in Table 3.

The cement content of 2% obtained the required TS of 1.5% and hence cement content dosages of 1% and 2.0% were selected as well as moisture content (MC) of 7.4%, 6.4% and 5.4%.

A further UCS procedure was then commenced at 5% silicate and 4% cation by weight of cement. The first UCS test results are shown in Table 4.

This provided a UCS of 0.9 which was less than expected. Therefore, another UCS test was done at 2% cement content with no added stabiliser and the result provided a UCS of 1.0. This illustrated that finishing the test series was not worthwhile at the lower moisture contents as the low fines and low plasticity of those fines was preventing effective compaction resulting in a low UCS.

Subsequently, a cement content of 2% and moisture content of 8.4% (OMC) was selected on the basis that the fines are not present in sufficient quantity and type to lubricate the compaction and thus as much water as possible was required.

Thereafter, the stabiliser dosages and cement content and moisture contents as set out in Table 5 were selected.

A UCS of 1.6 was achieved from a silicate dosage of 5% and cation dosage of 2%. The DD was 2.159 t/m$^3$. Other tests were not done as the TS was achieved with the minimum selected dosage.

The soil aggregate mixture therefore had an MC of 8.4%, cement content of 2% and silicate dosage of 0.1% based on the weight of the dry weight of the mixture and cation dosage of 0.04% based on the dry weight of the mixture.

This Example illustrates that the type and quantity of clays in the base material which had low plasticity as well as low LS would not significantly benefit from reduction of the cement content but will benefit from the water repellent or water proofing characteristics imparted to the base material by the stabiliser. The cement content of 2% was a low dosage in any event.

Example 4

Water absorbed onto a clay, i.e. water which interacts with the crystal lattice and crystal surface of the clay mineral causes its swelling. Pore water, i.e. water absorbed in inter-particle capillaries is only a minor contributor to clay swelling (Benchara and Prost, July 1993, Proc. Int. Clay Conf. Adelaide, Australia).

Swelling of soils is therefore a reflection of the clay content and clay type present. Since spontaneously dispersible clay content (i.e. smectite) is positively correlated with tensile strength of the soil, shrinkage may be taken as a measure of strength in stabilisation trials (Barzegar et al., July 1993, Proc. Int. Clay Conf. Adelaide, Australia).

It may be assumed that smectites are indeed responsible for swelling of soils, as there also exists a positive correlation between spontaneous dispersibility and exchangeable Na of soils (Barzegar et al. above).

The clay of black soil of igneous origin consists of smectite and kaolin (Norrish and Pickering, 1983, p297 in "Soils—An Australian Viewpoint" CSIRO—Academic Press Melbourne Australia), whereas metamorphic soil has kaolin and randomly interstratified material (Norrish and Pickering, 1983, pp. 299–300), providing adequate, contrasting mineralogy for testing the stabilisers. Randomly interstratified material is most probably chlorite-vermiculite-smectite layered material, also probably interlayered with kaolinite.

The smectitic black soil has the characteristic high pH and high shrinkage (Stace et al., 1968, p125 in "A Handbook of Australian Soils" Rellim Technical Publications Glenside, South Australia) and the yellow podsol (sandy loam) is acidic and with non-swelling clays (Stace et al., 1968, p35).

With the sandy loam (Table 6), the additive appears to "activate" at concentrations of 1 milli-mole (i.e. mmole) $Ca^{2+}$, (or other divalent cation) and 0.2 mmole $SiO_3^{2-}$ per 100 g aggregate (at optimum moisture). The effect of the cation on soil shrinkage reaches a plateau at and above this concentration, whereas the silicate may be added in greater quantities for increased effect.

With low shrinkage soil, relative shrinkage improvements of up to 50% may be noted, whereas 8% improvements occur with the same formula in black soil (Table 7). The stabilising agent shows a small but significant improvement over the use of cement alone in both types of soils.

Figure 2:
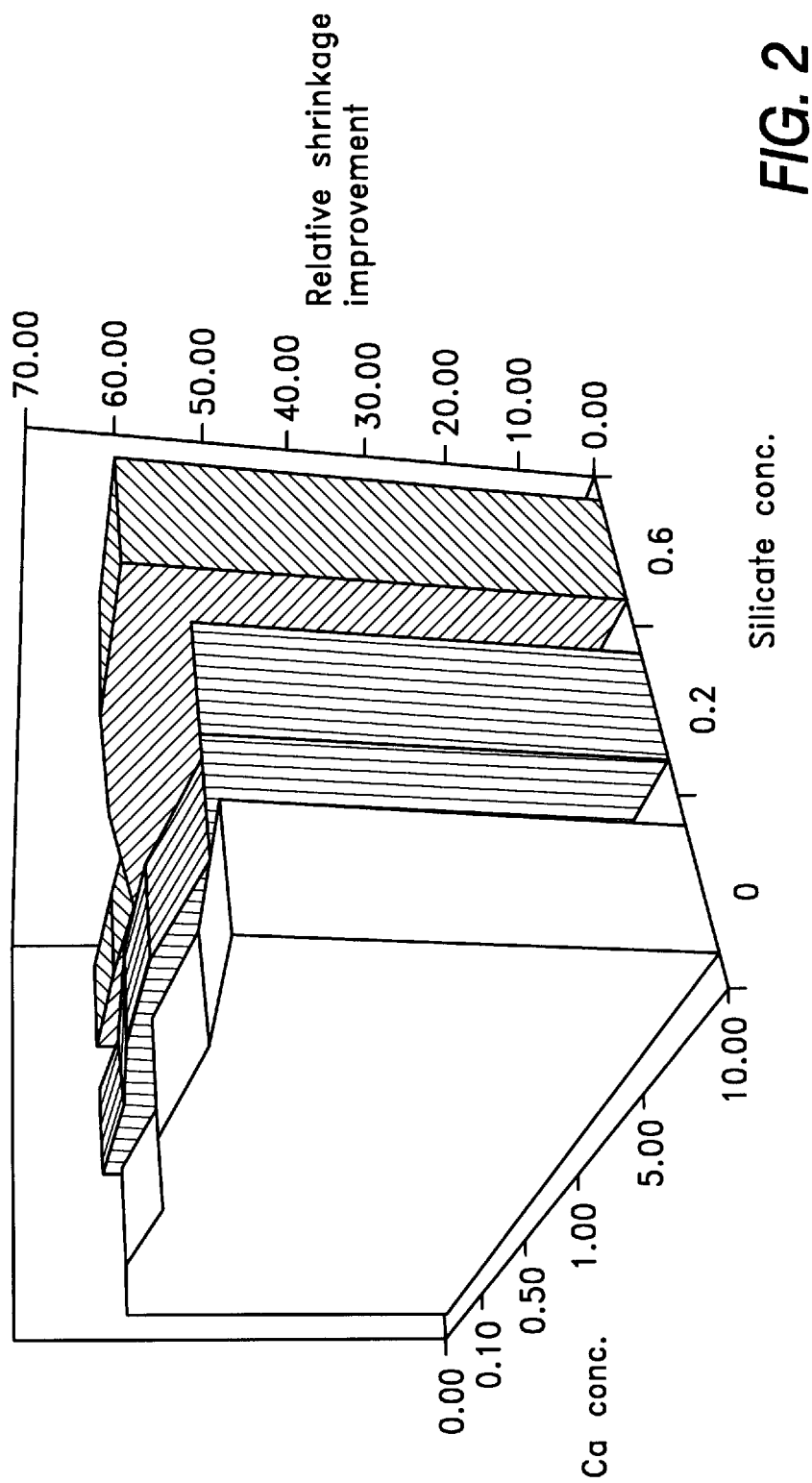
FIG. 2 is a graph showing the results of experiments reported in Example 4 showing calcium ion-silicate dependence of shrinkage of metamorphic soil.
Figure 3:
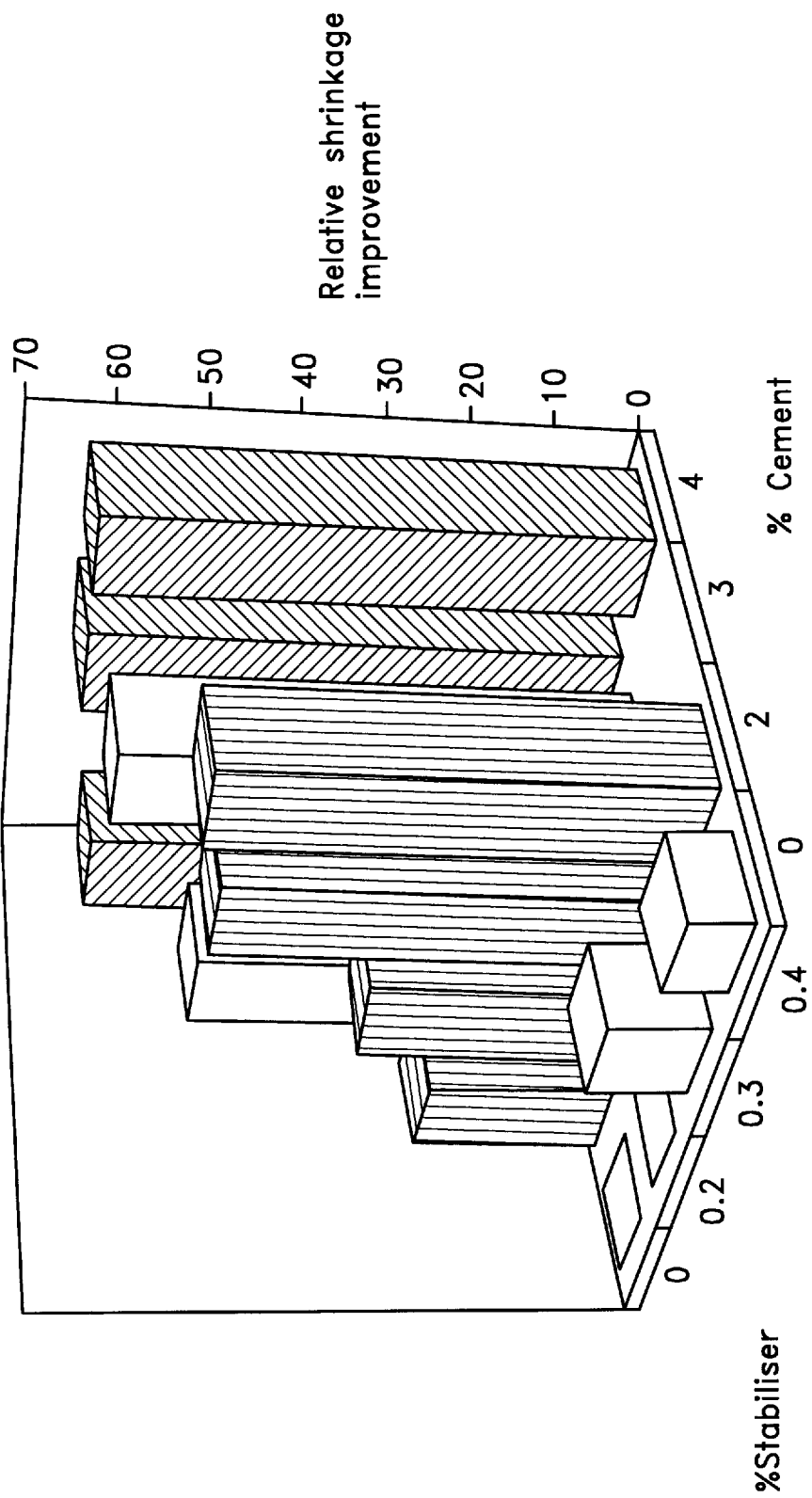
FIG. 3 is a graph showing the results of experiments reported in Example 4 referring to cement/metal salt/silicate dependence of shrinkage of sandy loam metamorphic soil.
Figure 4:
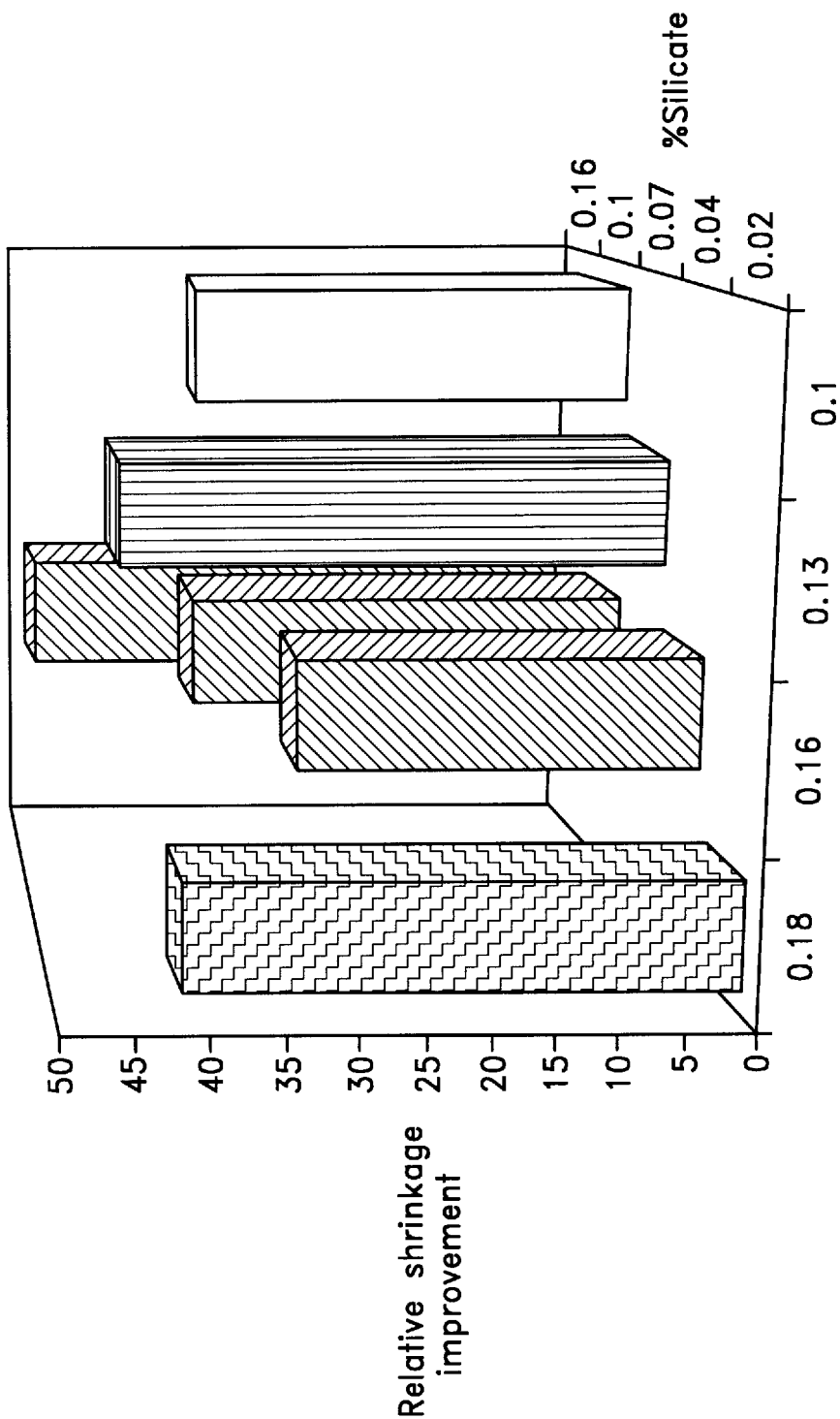
FIG. 4 is a graph showing the results of experiments reported in Example 4 referring to shrinkage characteristics of 2% cement/sandy loam mixture with different metal salt-silicate formulations.
Figure 5:
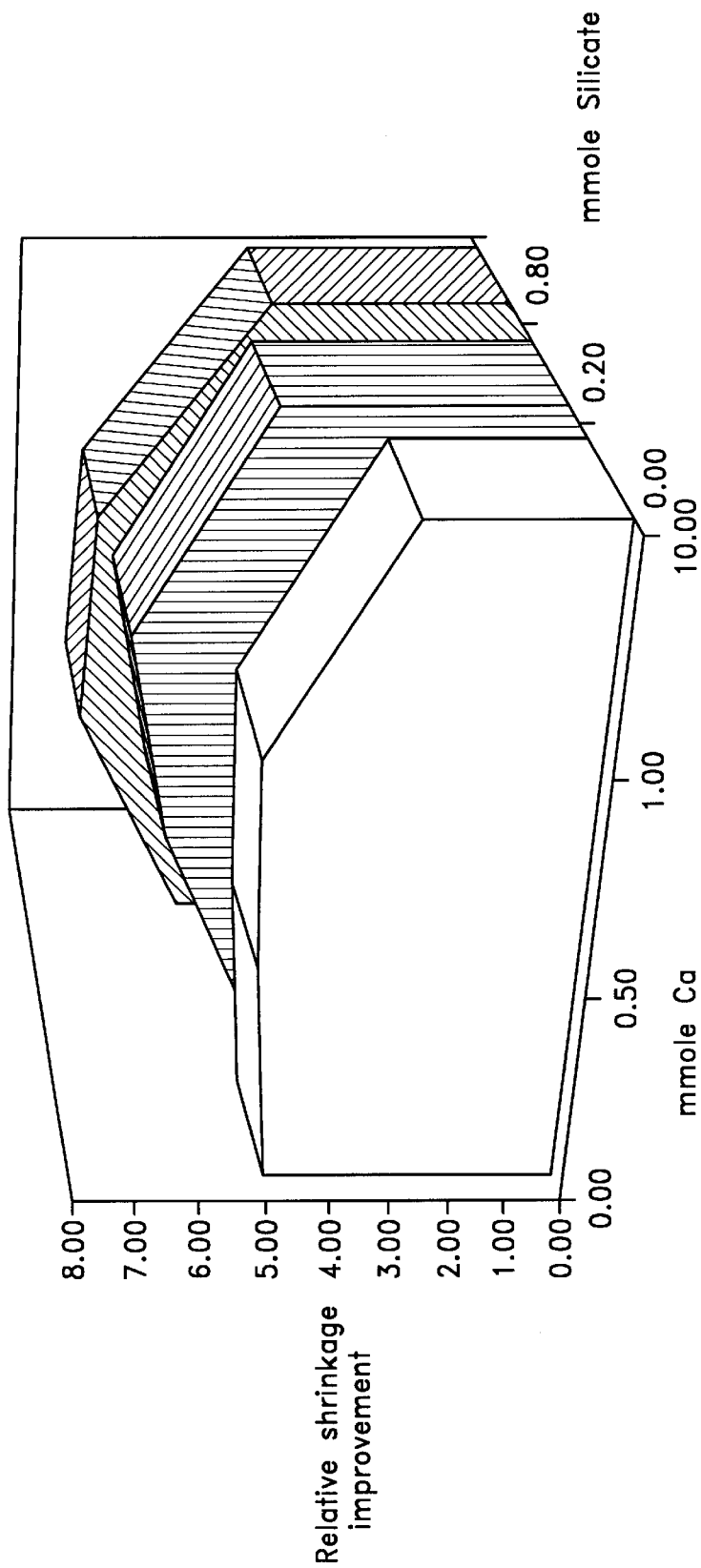
FIG. 5 is a graph showing the results of experiments reported in Example 4 referring to calcium ion/silicate concentration dependence of shrinkage of black soil.

FIG. 2 refers to calcium ion-silicate dependence of shrinkage of metamorphic soil. FIG. 3 refers to cement/metal salt-silicate dependence of shrinkage of sandy loam metamorphic soil. FIG. 4 refers to shrinkage characteristics of 2% cement/sandy loam mixture with different metal salt-silicate formulations. FIG. 5 refers to calcium ion/silicate concentration dependence of shrinkage of black soil.

Example 5

Mg has the same action on sandy loam as does Ca (Table 6). The anion used to deliver the metal is not important— RSI's are comparable for the nitrates and chlorides of each metal. As such, special-purpose anions such as nitrites may be used to deliver the cations, in order to impart additional, anti-oxidant or corrosion-preventative properties to the concrete mixture.

Transition metals (e.g. Co, Table 8) as well as other alkaline earths are effective (e.g. Ba, Table 8), although to some extent, transition metal ions are also able to form polymers as does Al. Mg may form polymeric brucite-type interlayers in smectites at high pH values, rather than directly replace exchangeable cations.

Example 6

The application of the soil stabilisation composition of the invention is described by way of two examples for different soils, following.

100 g of a soil with a low plastic index, very low cation exchange capacity (<10 mmole per 100 g soil), $5.5 \leq pH \leq 7$, and linear shrinkage≈3.9%, consisting largely of quartz, kaolinite (40–56%), and chloritised smectite (1–13%) (Norrish and Pickering, 1983, pp302–303; Stace et al., 1968, p35), may be stabilised with 1 mmole—10 mmole Ca, 0.8 mmole silicate and 2% cement, to achieve the same RSI as 4% cement alone.

As a second example, 100 g of a different soil containing 10–20% illites, 50–65% smectites, 20–30% kaolinite and 5–10% quartz, with very large plastic index, $7.5 \leq pH \leq 9$ (Norrish and Pickering, 1983, p302; Stace et al., 1968, p125), cation exchange capacity of 68 meq per 100 g and linear shrinkage of 18.7% (a black soil) must be treated with 0.5 mmole Ca, 0.2 mmole to 0.8 mmole silicate, and 2% cement to achieve the same RSI as with 3% cement alone. At the 2% cement level, more or less stabiliser is detrimental to the RSI of the soil.

In each of these cases, the increasing pH and increasing shrinkage is indicative of the increasing smectite content of the soil (and decreasing kaolinite/quartz content). Since clearly different ranges of stabiliser concentrations are necessary for effective soil treatment, a need for "tuning" the chemistry of the stabilisation composition is demonstrated.

Example 7

Factors which govern the cation exchange capacity (CEC) of a soil include:

(i) the type of clay minerals presents;

(ii) the form in which the clay minerals are present; and (iii) the quantities of those minerals.

The CEC of a clay mineral depends on the number of active sites available for exchange over the surfaces of its crystals. Therefore, the CEC of a mineral is a question of how great a surface area a crystal has exposed.

High CEC clay minerals such as montmorillonite or smectite have large surface area/volume ratios. The aluminosilicate sheets comprising the crystals of these types of minerals are loosely bound together and may part, exposing areas of active sites within the crystals, allowing ingress and egress of adsorbant ions. The metallic cations responsible for the loose binding of the sheets are highly mobile and the aluminosilicate surface have nett negative charge.

Micas and chlorites have similar structures although the sheets therein are more tightly bound to each other by metallic cations or cationic polymers. These cations charge balance the negative charges of the aluminosilicate sheets, so the inner surfaces of these types of minerals are unavailable for exchange.

The sheets of kaolinite, on the other hand, are held together by a tight network of hydrogen bonding. Again, in this system, ingress of cations is not favourable, so cation exchange may only occur on the outer surfaces of crystals. In micas, chlorites and kaolinite, the surface area/volume ratios of the crystals are greatly reduced with respect to smectites and have correspondingly lower CEC's.

Since CEC is a function of surface area of mineral exposed, the state of subdivision of the clay mineral is important. Generally, clay mineral crystals are sub-micron sized. For practical purposes, the size effects are similar for different minerals, so the clay mineral chemistry dominates the CEC. Kaolinite typically has CEC of 2–5 100 g and pH=4.5 (Levy et al., 1988, Soil Sci. Soc. Am. J., 52 1259), whereas Na, Ca—montmorillonites typically have CEC 77–80, pH—8.5–10 (Australian Bentonite, 1992, Cudgen R. Z. Ltd., "Trugel 100" specs), although CEC may reach 160 meq/100 g for pure Na bentonite.

Shrinkage of a soil corellates positively with its PI. As smectitic soils have high Pi relative to kaolinite soils, they tend to have greater shrinkages (all other factors being equal, e.g. the quantity of clay present, Pettry and Rich, 1971, Soil Sci. Soc. Amer. Proc. 35 834). Therefore, as the clay minerals are stabilised in soils by treatment, smectitite soils are expected to show greater relative shrinkage improvement over kaolinitic soils.

The bulk CEC of a soil is given by the quantities and types of clay minerals present in the soil. Therefore, the optimum dosages of ions (e.g. Ca ions) for stabilising each soil varies in accordance with the bulk CEC of the soils. To prove this by way of example, two soils were stabilised, i.e. treated with the stabilisation composition to achieve increased UCS. The Ca dosage necessary to stabilise each soil was found to mirror its clay content (and hence its CEC).

From the above, it will be appreciated that meq (i.e. milliequivalents) is millimoles×valency of the cation.

In regard to the abovementioned specific Examples and the determination of RSI, it will be found that if the RSI of a soil aggregate sample to which the stabilisation composition of the invention has been added is greater than the RSI of the sample which has been treated with cement only (i.e. no stabiliser) then the sample has been stabilised by the stabilisation composition of the invention.

It is also highly preferred that in the stabilisation composition of the invention that the only monovalent cation included therein is the alkali metal cation associated with the silication anion.

TABLE 1

| CEMENT TYPE | CEMENT CONTENT (by weight of soil aggregate base material) | UCS (MPa) |
|---|---|---|
| PCS | 2% | 2.1 |
| PCS | 4% | 3.3 |
| FAB | 2% | 1.4 |
| FAB | 4% | 2.6 |

TABLE 2

| PD SIEVE (MICRONS) | % PASSING |
|---|---|
| 37.500 | 100 |
| 26.500 | 99 |
| 19.000 | 97 |
| 9.500 | 79 |
| 4.750 | 60 |
| 2.360 | 55 |
| 0.425 | 40 |
| 0.075 | 10 |

TABLE 3

| CEMENT CONTENT (CC) | OMC | MC (actual) | Dry Density (actual) | UCS |
|---|---|---|---|---|
| 1% | 8.4 | 8.5 | 2.137 | 0.5 |
| 2% | 8.4 | 8.3 | 2.141 | 1.5 |
| 3% | 8.4 | 7.2 | 2.187 | 2.0 |

TABLE 4

| CC | MC (actual) | SILICATE | CATION | Dry Density (actual) |
|---|---|---|---|---|
| 2 | 5.3 | 5 | 4 | 2.052 |

TABLE 5

| SILICATE | CATION | CC | MC |
|---|---|---|---|
| 5% | 2% | 2 | 8.4 |
| 5% | 4% | 2 | 8.4 |
| 5% | 6% | 2 | 8.4 |

TABLE 6

Sandy Loam Tests with Ca/Silicate Stabilisers.
Relative Shrinkage Improvements are reported since the blank samples of different trials had different shrinkages.

| cement | mmole $Ca^{2+}$ | mmole $SiO_3^{2-}$ | Relative Shrinkage Improvement |
|---|---|---|---|
| 2 | 0 | 0 | 52.58 |
|   | 0 | 0.2 | 56.09 |
|   | 0 | 0.8 | 56.02 |
| 2 | 0.1* | 0 | 54.78 |
|   | 0.1* | 0.2 | 54.28 |
|   | 0.1* | 0.8 | 54.75 |
| 2 | 0.5 | 0 | 51.12 |
|   | 0.5 | 0.2 | 54.90 |
|   | 0.5 | 0.8 | 53.36 |

TABLE 6-continued

Sandy Loam Tests with Ca/Silicate Stabilisers.
Relative Shrinkage Improvements are reported since the
blank samples of different trials had different shrinkages.

| cement | mmole $Ca^{2+}$ | mmole $SiO_3^{2-}$ | Relative Shrinkage Improvement |
|---|---|---|---|
| 2 | 1.0 | 0 | 53.85 |
|  | 1.0 | 0.2 | 53.95 |
|  | 1.0 | 0.8 | 58.22 |
| 2 | 5.0 | 0 | 50.62 |
|  | 5.0 | 0.2 | 49.08 |
|  | 5.0 | 0.8 | 60.49 |
|  | 10.0 | 0 | 51.20 |
|  | 10.0 | 0.2 | 52.92 |
|  | 10.0 | 0.8 | 59.82 |

TABLE 7

Black Soil Tests with Ca/Silicate Stabilisers
Relative Shrinkage Improvements are reported since the
blank samples of different trials had different shrinkages

| Cement | $Ca^{2+}$ concentration (mmole) | $SiO_3^{2-}$ concentration (mmole) | Relative Shrinkage Improvement |
|---|---|---|---|
| 2 | 0 | 0 | 4.90 |
|  | 0 | 0.2 | 4.45 |
|  | 0 | 0.8 | 5.19 |
| 2 | 0.5 | 0 | 5.20 |
|  | 0.5 | 0.2 | 6.05 |
|  | 0.5 | 0.8 | 7.08 |
| 2 | 1.0 | 0 | 5.38 |
|  | 1.0 | 0.2 | 6.81 |
|  | 1.0 | 0.8 | 6.86 |
| 2 | 10.0 | 0 | 3.32 |
|  | 10.0 | 0.2 | 4.81 |
|  | 10.0 | 0.8 | 4.22 |
| 3 | 0 | 0 | 7.10 |
|  | 1.0 | 0 | 9.35 |
|  | 1.0 | 0.2 | 8.40 |

| Cement | $Al^{3+}$ concentration (mmole) | $SiO_3^{2-}$ concentration (mmole) | Relative Shirinkage Improvement |
|---|---|---|---|
| 2 | 1.0 | 0 | 15.23 |
|  | 1.0 | 0.2 | 14.78 |

TABLE 8

RSI vaues for a range of metal/silicates treatments of sandy loam

| SALT | RSI |
|---|---|
| $MgCl_2$ | 53.5 |
| $Mg(NO_3)_2$ | 53.5 |
| $CaCl_2$ | 53.5 |
| $Ca(NO_3)_2$ | 54.0 |
| $BaCl_2$ | 41.9 |
| $CoCl_2$ | 46.5 |

TABLE 9

| TYPE | I | II |
|---|---|---|
| LS | 2.6 | 8.6 |
| PI | 5.6 | 14.8 |
| OMC | 7 | 8 |
| MDD | 2.20 | 2.13 |
| % passing 425μ | 31 | 18 |
| % clay in –425μ | 4 | 8 |
| % clay in bulk | 1.24 | 1.44 |
| bulk CEC (calcd)[a] | 0.6–1.2 | 1.2–2.2 |
| optimum Ca meg/100 g soil dose found |  |  |
| mmole/100 g soil | 0.62 | 3.09 |
| mmole/100 g clay | 8 | 45 |
| g/2500 g soil[b] | 4.2 (i.e. 0.02% of soil aggregate mixture) | 21.0 (i.e. 0.8% of soil aggregate mixture) |

LEGENDS

Table 6

* 0.0 mmole $Ca^{2+}$ corresponds to 0.004 g of Ca per 100 g sandy loam

Table 9

[a] The fines actually consist of mixtures of minerals:
Type I has 4% smectite/RIM, CEC=80–150 meq/100 clay
Type II has 3% kaolinite, CEC=1–4 and 5% smectite/RIM, CEC=80–150 meq/100 clay

[b] Ca given as Ca(NO3)2.6H2O.

FIG. 2

Ca/Silicate concentration dependence of shrinkage of metamorphic soil.

FIG. 3

Cement/metal salt-silicate dependence of shrinkage of sandy loam (metamorphic soil).

FIG. 4

Shrinkage characteristics of 2% cement/sandy loam mixture with different metal salt-silicate formulations.

FIG. 5

Ca/Silicate dependence of shrinkage of black soil.

We claim:

1. A method of stabilising soil and aggregate for structural purposes including the steps of:
   (i) combining a soil aggregate base material with a composition comprising:
      (a) an alkali metal silicate; and
      (b) a water soluble divalent or trivalent cation;
   (ii) adding cement to the combination of the base material and the composition wherein the minimum amount of cement added is 1% based on the weight of the soil aggregate base material; and
   (iii) adding water to the resulting mixture whereby sufficient water is added to the resulting mixture to hydrate the cement and thereby provide a stabilised soil aggregate matrix suitable for use in a structure.

2. A method as claimed in claim 1 wherein the silicate is added to the soil aggregate base material prior to addition of cation.

3. A method as claimed in claim 1 wherein the cation is added to the mixture in an amount of 0.004–3% based on the dry weight of the mixture.

4. A method as claimed in claim 3 wherein the cation is added to the mixture in a maximum amount of 1% based on the dry weight of the mixture.

5. A method as claimed in claim 3 wherein the cation is added to the mixture in an amount of 0.1–2% based on the dry weight of the mixture in the case of structures other than road pavements.

6. A method as claimed in claim 3 wherein the cation is added to the mixture in an amount of 0.03–0.095%.

7. A method as claimed in claim 3 wherein the cation is added in an amount of 0.03–0.3% based on the dry weight of the mixture in the case of road pavements.

8. A method as claimed in claim 1 wherein the amount of cement utilised is 1.5–4% based on the dry weight of the mixture.

9. A method as claimed in claim 8 wherein the amount of cement utilised is 2–3% based on the dry weight of the mixture.

10. A method as claimed in claim 1 wherein the amount of silicate utilised comprises 0.001–1% based on the dry weight of the mixture.

11. A method as claimed in claim 10 wherein the amount of silicate utilised comprises 0.075–0.3% based on the dry weight of the mixture.

12. A method as claimed in claim 1 wherein the soil aggregate base material has a linear shrinkage (LS) of above 8.

13. A method as claimed in claim 12 wherein the soil aggregate base material has an LS between 10–14.

14. A method as claimed in claim 1 wherein the amount of cation present in the soil aggregate based material is determined prior to addition of the composition.

15. A method of forming a structure which includes the steps of:
   (i) sampling a soil aggregate base material to carry out one or more Atterberg tests or Unconfined Compressive Strength (UCS) or California Bearing Ratio (CBR) so as to determine the properties thereof;
   (ii) determining target amounts of cement from the results of such tests; and
   (iii) substituting a percentage of the target amounts of cement with a composition comprising:
      (a) an alkali metal silicate; and
      (b) a water soluble divalent or trivalent cation.

16. A method as claimed in claim 15 wherein the soil aggregate base material and the composition is mixed with a minimum amount of 1% of cement based on the dry weight of the total mixture.

17. A method as claimed in claim 16 wherein the soil aggregate base material is initially mixed with the composition prior to the addition of cement and subsequently sufficient water is added to the resulting mixture to hydrate the cement and thereby provide a structure formed from a stabilised soil aggregate matrix.

18. A method as claimed in claim 17 wherein the cation is incorporated in said mixture at an amount of 0.004–3% based on the dry weight of the mixture.

19. A method as claimed in claim 18 wherein the cation is employed in said mixture at a maximum rate of 1% based on the dry weight of the mixture.

20. A method as claimed in claim 15 wherein 5–15% of the target weight of cement used in the mixture is augmented by the stabilisation composition.

21. A method as claimed in claim 20 wherein 10% of the target weight of cement used in the mixture is augmented by the composition.

22. A method as claimed in claim 15 wherein the composition comprises sodium silicate as the gel precursor and calcium ion as the cation.

23. A stabilisation formulation for a soil aggregate base material useful for forming a structure including:
   1–25% by weight of the base material of cement;
   0.001–10% by weight of the base material of alkali metal silicate; and
   0.004–3.0% by weight of the base material of water soluble trivalent or divalent cation.

24. A stabilisation formulation as claimed in claim 23 including 1.5–4% by weight of of the material of cement and 0.075–3% by weight of the base material of silicate.

25. A stabilisation formulation as claimed in claim 23 including 2–3% of cement.

26. A stabilisation formulation as claimed in claim 23 including 1–2% by weight of the base material of trivalent or divalent cation.

27. A stabilisation formulation as claimed in claim 23 including 0.004–1% by weight of trivalent or divalent cation.

28. A stabilisation formulation as claimed in claim 23 including 0.03–0.095% by weight of divalent or trivalent cation.

29. A soil stabilisation formulation for stabilisation of soil aggregate base material used for making road pavements including:
   1.5–4% by weight of the soil aggregate material of cement;
   0.004–3% by weight of the soil aggregate material of water soluble divalent or trivalent cation; and
   0.001–10% by weight of the soil aggregate material of alkali metal silicate.

30. A soil stabilisation formulation as claimed in claim 29 including 2–3% by weight of the base material of cement.

31. A soil stabilisation formulation as claimed in claim 29 including 0.004–1% by weight of the base material of water soluble divalent or trivalent cation.

32. A structure formed from the method of claim 1.

33. A structure formed from the method of claim 15.

* * * * *